July 20, 1965  B. A. LOOMANS ET AL  3,195,868
CONTINUOUS MIXER

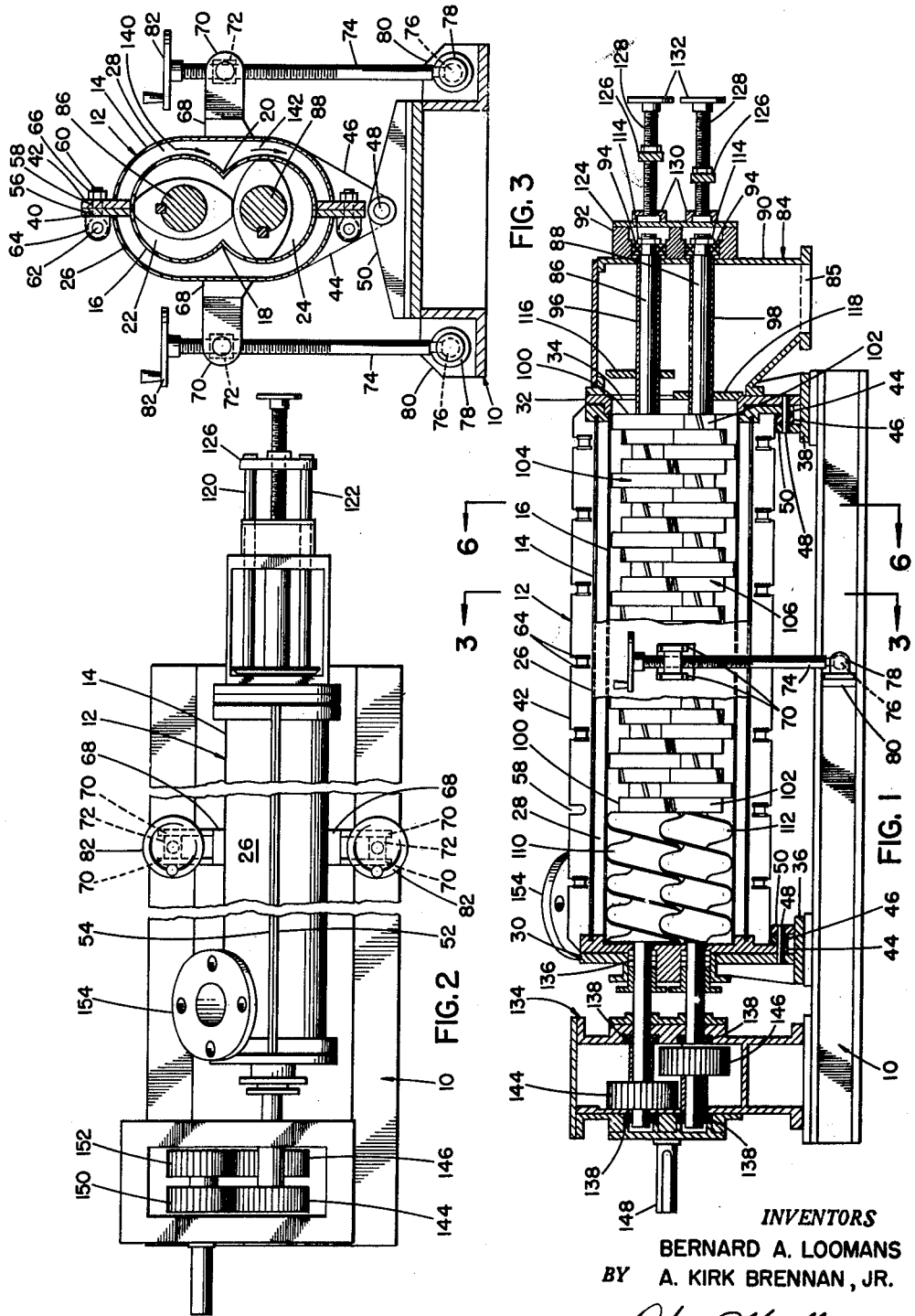

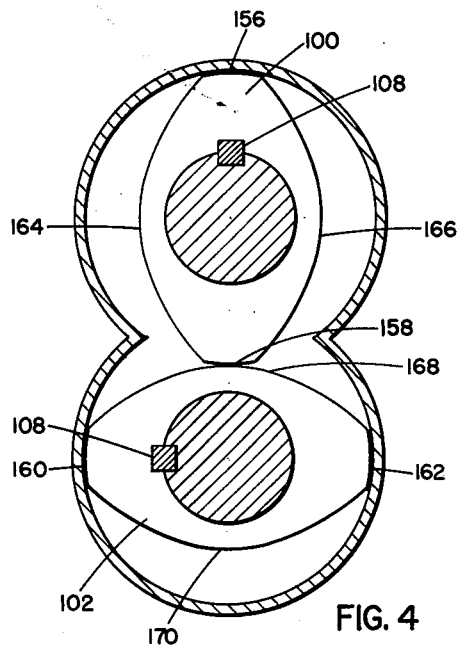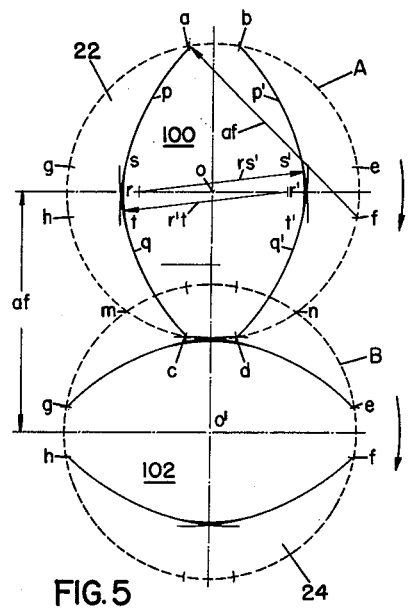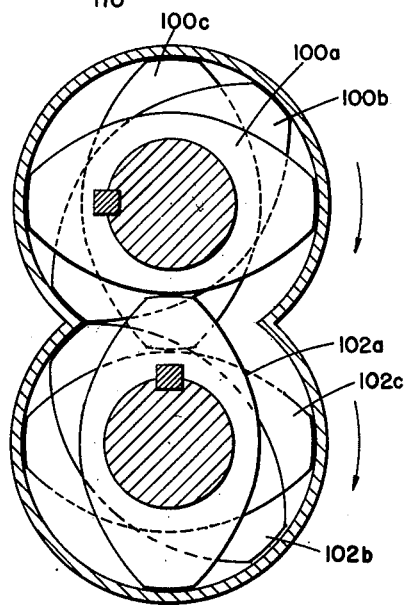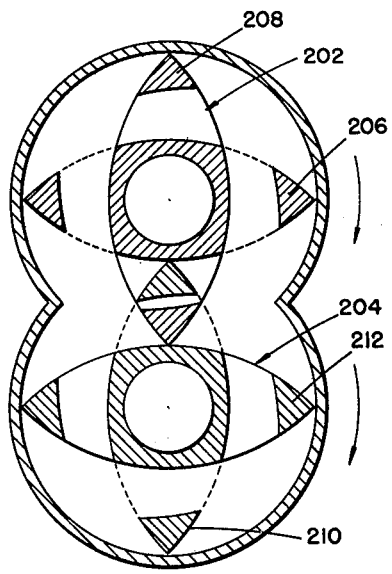

Filed March 21, 1962  3 Sheets-Sheet 3

INVENTOR.
BERNARD A. LOOMANS
BY  A. KIRK BRENNAN, JR.

*Otto Moeller*
Attorney

United States Patent Office 3,195,868
Patented July 20, 1965

3,195,868
CONTINUOUS MIXER
Bernard A. Loomans, York, and Ambrose K. Brennan, Jr., Thomasville, Pa., assignors, by mesne assignments, to Baker Perkins Inc., New York, N.Y., a corporation of New York
Filed Mar. 21, 1962, Ser. No. 181,278
11 Claims. (Cl. 259—104)

This invention relates to apparatus for homogeneously mixing and/or kneading a variety of materials which may be in plastic, liquid, granular or powdered form, and more particularly to a continuous mixing and kneading apparatus.

It is an object of the invention to provide an improved mixing and kneading apparatus of the type described including a pair of parallel longitudinally extending intersecting communicating chambers having a pair of interconnected shafts extending therethrough provided with mixing and kneading elements constructed and arranged to provide more intimate and complete mixing of ingredients into a homogeneous mixture than heretofore.

Another object is to provide improved mixing and kneading apparatus embodying two interengaging mixing elements disposed in intersecting cylindrical housings, mounted therein to rotate in the same direction and wherein the mixing elements may consist of a plurality of progressively angularly displaced paddles, either straight or formed on a helix, or a combination of such paddles and a continuous helical mixing element section at the infeed end portion of a continuous mixing and kneading apparatus.

A further object is to provide improved mixing and kneading apparatus of the type described above wherein the mixing and kneading elements effectively wipe the walls of their enclosing housings, and the flanks of each mixing and kneading element in one housing is effectively wiped by the cooperating interengaging mixing and kneading element in the other housing.

In the continuous kneading and mixing of dense plastic or dry materials, considerable power is required to rotate the kneading and mixing elements, thereby subjecting them to high torsional and bending stresses. The invention has, therefore, the further object to provide mixing elements of such cross sectional configuration that will accommodate a shaft of large diameter to resist such torsional and bending stresses and that at the same time are self cleaning and provide a large volume thru-put of material.

A further object is to provide improved mixing and kneading apparatus embodying two interengaging mixing elements disposed in intersecting cylindrical housings, mounted therein to rotate in the same direction and wherein the mixing elements include a plurality of interengaging paddles, the paddles being formed to provide greater shear areas between interengaging paddles than in prior mixing and kneading devices whereby to subject the materials being treated to more intense mixing and kneading per revolution of the paddles than heretofore. An ancillary object is to provide in such apparatus paddles formed to wipe not only the walls of their enclosing housings but also wherein all interengaging surfaces of the paddles are wiped clean, one by the other.

The mixing and kneading paddles of the invention are so constructed and arranged in their enclosing cylindrical housings so that the material acted on is compressed in pockets formed during rotation of a pair of interengaging paddles between their flanks and the housing wall and which pocket in the zone of greatest compression, the zone adjacent the contiguous portions of the paddle flanks, is during a portion of each revolution of the paddles successively cut off by a blade of a succeeding pair of interengaging paddles, to alternately squeeze and force the material from the zone of greatest compression backward and forward into the zone of action of the adjacent pair of interengaging paddles whereby to subject the materials to an intense shearing and kneading action.

A further object is to provide an improved continuous mixer of the type having a pair of interengaging mixing elements axially disposed in intersecting cylindrically housings, with a material inlet adjacent one end and an open ended material discharge outlet at the opposite end, the discharge outlet being controlled by a pair of weir plates arranged for independent axial movement toward and away from the discharge outlet to control the discharge of material from the mixer and the retention of the material therein.

Other objects and advantages reside in certain novel features of the construction, arrangement and combination of parts which will be hereinafter more fully described, reference being had to the accompanying drawings forming a part of this specification, and in which drawings:

FIGURE 1 is a longitudinal vertical sectional view taken through the improved mixing and kneading apparatus, with parts being shown in side elevation;

FIGURE 2 is a plan view of the apparatus shown in FIGURE 1, with parts broken away;

FIGURE 3 is a sectional view taken on line 3—3 of FIGURE 1;

Figure 7:
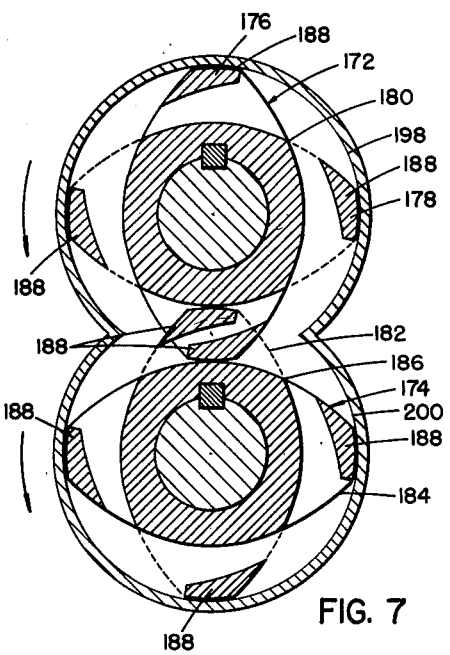
Figure 8:
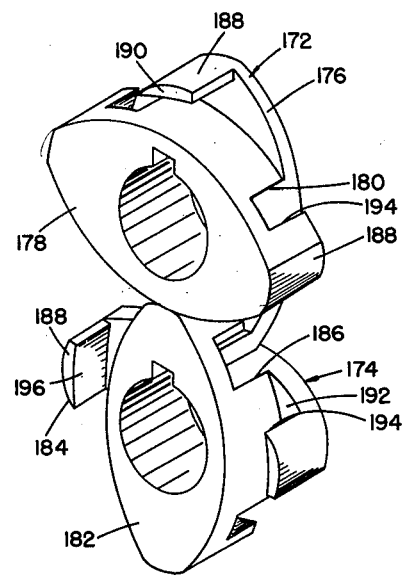
Figure 10:
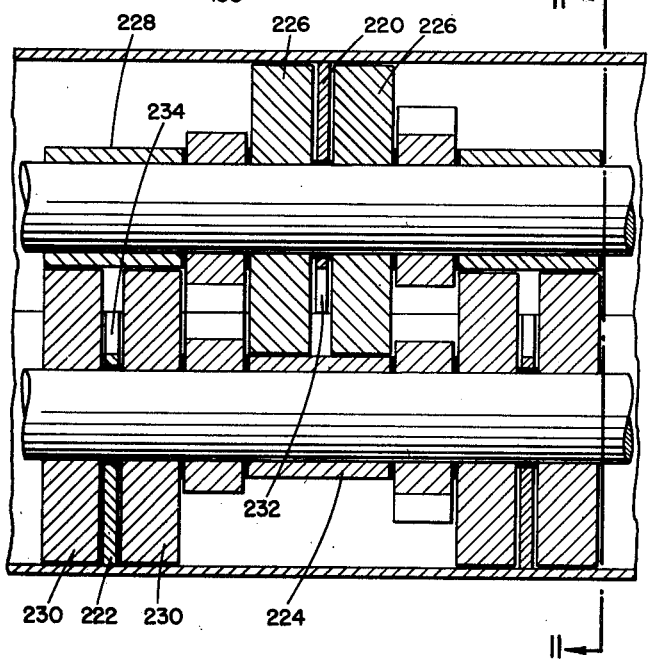
Figure 11:
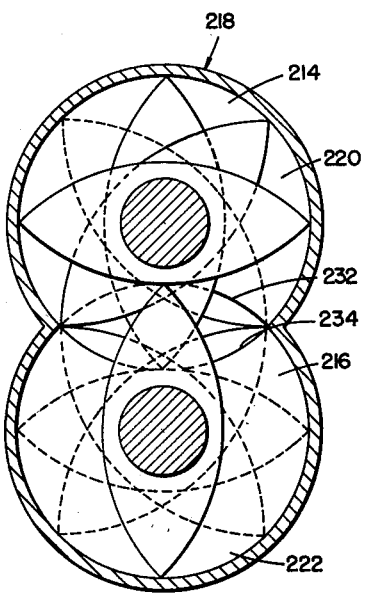

FIGUSE 4 is an enlarged transverse sectional view through the housing of the mixer showing a pair of cooperating paddles;

FIGURE 5 is a more or less diagrammatic view showing the profiles of a pair of cooperating paddles and illustrating the manner in which the profiles are arrived at;

FIGURE 6 is a more or less diagrammatic view showing three pairs of adjoining cooperating paddles and illustrating how the compression pocket between one pair of cooperating blades is partially closed off by a paddle of an adjoining pair of cooperating paddles;

FIGURE 7 is a transverse sectional view through a mixer housing, showing a modified form of cooperating paddles;

FIGURE 8 is an isometric view of the pair of paddles shown in FIGURE 7;

FIGURE 9 is a sectional view showing a modified form of the paddles of FIGURES 7 and 8;

FIGURE 10 is a fragmentary longitudinal vertical sectional view through a modified form of mixer barrel, showing baffles therein; and FIGURE 11 is a sectional view taken on line 11—11 of FIGURE 10.

Referring now to the drawings, particularly to FIGURES 1, 2 and 3, the structure selected for illustration comprises a base 10 of any suitable construction for the support of the mixer housing 12 in which is contained the materials to be mixed and the means for mixing the same.

The mixer housing 12 includes a horizontal longitudinally extending open ended barrel 14 comprising an inner wall 16 which in transverse cross section is in the form of upper and lower circular major arcs intersecting at 18 and 20 to provide communicating upper and lower intersecting cylindrical chambers 22 and 24, and comprising an outer wall 26 in spaced surrounding relation with respect to the inner wall 16, forming a jacket 28 therebetween to hold a cooling or heating medium.

The barrel 14 is spaced a distance above the base 10 and extends between the transversely extending end plates 30 and 32, end plate 30 forming a closure for the infeed end of the barrel 14 and end plate 32 being provided with a discharge opening 34 the extent of which is controlled by means to be described. The lower ends of the end plates 30 and 32 are provided with respective flanges 36 and 38 resting on and through which the end plates 30 and 32 are rigidly secured on the base 10 by welding or other suitable means.

The barrel 14 is preferably vertically split on its longitudinal center line into the two mating barrel sections 40 and 42 to permit opening of the barrel 14 for facilitating access to the interior thereof. The barrel sections 40 and 42 are pivotally supported subjacent their mating lower forward and rearward edge portions whereby they may be swung outwardly and downwardly to expose the interior thereof. For this purpose, referring to the forward or infeed end of the barrel 14, the barrel sections 40 and 42 are provided adjacent their mating lower forward end portions with the respective depending transversely extending overlapping ears 44 and 46. A longitudinally extending pivot pin 48 extends through registering openings in the ears 44 and 46, one end of pin 48 being supported in the lower portion of the end plate 30 and the other end thereof being supported in an upstanding lug 50 on the flange 36 of plate 30. A similar pivotal arrangement, as shown in FIGURE 1, is provided at the lower rearward or discharge end of the barrel sections 40 and 42.

Any suitable means may be provided for releasably clamping the barrel sections 40 and 42 together. As shown, the adjacent mating upper and lower ends of the barrel sections 40 and 42 are provided with confronting longitudinally extending flanges 52 and 54 provided with a series of longitudinally spaced registering slots 56 and 58. Threaded bolts 60 are pivotally mounted on pivot pins 62 supported by lugs 64 disposed at opposite sides of each of the slots 56 of the flanges 52 of the barrel section 40. The threaded bolts 60 are arranged to be received in the slots 56 and 58, and nuts 66 threaded on the projecting free ends of the bolts when drawn up tightly against the flanges 54 of the barrel section 42, securely clamp the barrel sections 40 and 42 together.

In order to facilitate opening of the barrel sections 40 and 42 about their previously described pivotal mounting, the means for opening the barrel section 40 will now be described, it being understood that similar means is also provided for opening the barrel section 42. Extending laterally outward of the barrel section 40 midway of the ends thereof is a mounting pad 68 to which are removably affixed a pair of longitudinally spaced outwardly extending bearing members 70 arranged to pivotally support therebetween a block 72. A stem 74 is threaded through the block 72 and at its lower end carries a ball member 76 mounted in a split socket member 78 which is supported for pivotal movement about a longitudinally extending horizontal axis on a bracket 80 disposed on the side of the base 10. At its upper end, the stem 74 carries a hand wheel 82 to faciliate turning of the stem 74 in one direction for opening the barrel section 40 and in the opposite direction for closing the same. Thus upon turning the stem 74 in one direction, the pivotally mounted block 72 moves downwardly on the stem 74 whereby the stem 74 and the barrel section 40 swing outwardly and downwardly about their respective pivotal mountings to effect opening of the barrel section 40, and turning of the stem 74 in the opposite direction so that the pivotally mounted block 72 travels upwardly on the stem 74 effects closing of the barrel section 40.

Suitably secured to the end plate 32 is a discharge housing 84 providing communication with the barrel 14 through opening 34 in the end plate 32. The lower end of discharge housing 84 is formed to provide a discharge spout 85.

Extending longitudinally throughout each of the chambers 22 and 24 concentric with the arcuate wall portions of the barrel 14 defining the chambers 22 and 24 and projecting beyond the ends thereof are respective upper and lower shafts 86 and 88. The rear wall 90 of discharge housing 84 is provided with the bearing housing 92 supporting upper and lower ball bearing races 94 in which are respectively mounted the rearward ends of upper and lower shafts 86 and 88.

Sleeves 96 and 98 are telescopically mounted on the rearward ends of shafts 86 and 88, the forward ends of sleeves 96 and 98 projecting through the opening 34 and abutting the rearmost end paddles of a series of abutting upper and abutting lower paddles 100 and 102 of upper and lower mixing units 104 and 106. Paddles 100 and 102 are keyed on their respective shafts 86 and 88, as shown at 108 in FIGURE 4, fixed against relative rotation with respect to their shafts but axially slidable therealong to faciliate assembly and disassembly. The foremost paddles 100 and 102 abut against the spiral feed screws 110 and 112 of mixing units 104 and 106, and are formed with or rigidly secured on the shafts 86 and 88 in the infeed end portion of the barrel 14. As shown in FIGURE 1, the rearward end of the sleeve 98 abuts against the bearing race 94, and a lock nut 114 threaded on the rearward end of shaft 88 when tightly drawn up against bearing race 94, causes the sleeves 98 to press the series of paddles 102 tightly against each other and against the spiral feed screw 112. It is understood, though not shown, that a similar arrangement is provided for drawing the paddles 100 tightly up against each other and against the spiral feed screw 110.

The opening 34 from the barrel 14 into the discharge housing 84 is controlled by upper and lower weir plates 116 and 118. The weir plates 116 and 118 are longitudinally slidably mounted on the sleeves 96 and 98, being arranged when moved to the left, as viewed in FIGURE 1, to seat against the edge of the end plate 32 defining the opening 34 to form a closure therefor. Means is provided for individually moving either of the weir plates 116 and 118 rearwardly a desired distance from closed position to control the opening 34. For this purpose, referring to FIGURES 1 and 2, a pair of longitudinally disposed rods 120 and 122 spaced at opposite sides of the sleeves 96 are rigidly secured at one end in any suitable manner to the rear face of the weir plate 116 and extend through and are slidably supported in the bearing housing 92 and the bearing housing cover 124. The projecting ends of the rods 120 and 122 are connected by a cross plate 126 and a threaded stem 128 is threaded through the cross plate 126 intermediate the ends thereof. One end of the threaded stem 128 is rotatably journaled in a split bearing 130 on the bearing housing cover 124 while the opposite or free end thereof is provided with a hand wheel 132. It is evident then, that by turning the hand wheel 132 and consequently the threaded stem 128 in one direction or the other, the interconnected cross plate 126, rods 120 and 122, and weir plate 116 will be moved in a forward or rearward direction, whereby the weir plate may be moved to closed position or opened to any desired extent. It is understood that a similar arrangement is provided for moving the weir plate 118.

At the infeed end of the barrel 14, shafts 86 and 88 project through end plate 30 and into a gear housing 134 suitably mounted on the forward end of the base 10. In order to prevent leakage of material from the barrel 14, packing glands 136 are provided on shafts 86 and 88 secured in any well known manner to the end plate 30. Suitable bearings 138 for the forward ends of the shafts 86 and 88 are mounted in the opposite end walls of the gear housing 134.

The mixing units 104 and 106 are rotated in the same direction as indicated by the directional arrows 140 and 142. For that purpose, axially spaced gears 144 and 146 are disposed in the gear housing 134 on shafts 86 and 88, respectively. A drive shaft 148, offset laterally and disposed between the horizontal planes of the shafts 86 and 88 extends into and is suitably journaled in the gear housing 134. Mounted on the drive shaft 148 are axially spaced gears 150 and 152, the gear 150 meshing with gear 144 and the gear 152 meshing with gear 146.

The material to be mixed is introduced into the barrel 14 through conduit 154 arranged to open into the upper forward end portion of one of the barrel sections 40, 42, in the present instance barrel section 40.

Each of the paddles 100 and 102 is identical in cross section, being generally lens shaped. Each pair of mating paddles 100 and 102 is disposed with the major axis of one paddle at right angles with respect to the major axis of the other paddle, as best shown in FIGURE 4. Considering one pair of mating paddles 100 and 102, the paddle 100 at the extremities of its major axis is formed with arcuate crests 156 and 158 having a radius of curvature equal, except for a negligible amount to provide working clearance, to the radius of curvature of the wall defining the chamber 22. Paddle 102 is provided with similar arcuate crests 160 and 162. It is evident then, that upon rotation of the paddles 100 and 102, their respective crests wipe clean the walls of their respective chambers 22 and 24.

The flank profiles of the paddles 100 and 102 are of such a configuration that when the shafts 86 and 88 are revolved at the same speed and in the same direction, each paddle on one shaft has its entire flanks wiped clean by a mating paddle on the other shaft.

The geometry of the flank profiles of the paddles 100 and 102 may best be described with reference to FIGURES 4 and 5. Let the broken line circle A define the chamber 22 of barrel 14. On the circle A lay out the diametrically opposite crests $ab$ and $cd$ of a paddle 100, and at 90° let $ef$ and $gh$ simulate the crests 162 and 160 of mating paddle 102 in chamber 24. The line $af$ will now determine the center distance between the chambers 22 and 24, and broken line circle B with a radius equal to that of circle A will now define the chamber 24. The two chambers 22 and 24 represented by circles A and B intersect at $m$ and $n$ on circles A and B, with the overlapping portion of the two circles defining the communicating opening between the chambers 22 and 24.

With $f$ and $e$, the simulated crest edges of mating paddle 102 in chamber 24, as centers, and radii $af$ and $ec$, arcs $p$ and $q$ define or generate the major profile protions of one flank of paddle 100 in chamber 22. The portion of the flank of paddle 100 engaged by the crest of a mating paddle 102 is defined by arc $r$ intersecting arcs $p$ and $q$ at $s$ and $t$, arc $r$ being described about center $o$ and formed with a radius equal to the center distance $o$, $o'$ of circles A and B minus one half the diameter of circle A. The profile of flank 164 of paddle 100, FIGURE 4, is thus defined by arcs $p, r$, FIGURE 5.

In similar manner, the profile of flank 166 of paddle 100, FIGURE 4, is defined by arcs $p'\ r'$ and $q'$, FIGURE 5, arcs $p'$ and $q'$ with radii $gd$ and $hb$ being described from simulated crest edges $g$ and $h$ of the crest 160 of paddle 102, and arc $r'$ intersecting arcs $p'$ and $q'$ at $s'$ and $r'$ described about center $o$ with a radius equal to the center of distance $o, o'$ minus one half the diameter of circle A.

Paddle 102, in cross section, is identical in size and configuration with paddle 100, and the profile of its flanks 168 and 170, FIGURE 4, may be described in the same manner as described above in connection with flanks 164 and 166 of paddle 100.

When constructed in the manner above described, and with the paddles rotating in the same direction and at the same speed, the crests of the paddles will wipe clean the walls of their respective chambers 22 and 24. Also, the flanks of each paddle are wiped clean by the crest edges and crests of a mating paddle. As a result there is no accumulation of material on the walls of the chambers nor on the flanks of the rotors whereby the apparatus is self cleaning and provides more efficient and homogeneous mixing.

As shown in FIGURE 1, paddles 100 and 102 are in the form of short spirals, pitched in a direction to move the material acted upon along the chambers 22 and 24 toward the discharge end of the barrel 14. The continuous spiral feed screws 110 and 112 of mixing units 104 and 106, in cross section have the same configuration as the paddles 100 and 102, described above, and consequently their respective crests wipe clean the walls of their respective chambers 22 and 24, and the flanks of each spiral feed screw is wiped clean by the other spiral feed screw, in the same manner as described above in connection with the paddles 100 and 102.

The spiral feed screws 110 and 112 are pitched in a direction to advance material from the infeed end of the barrel 14 to the paddles 100 and 102. The continuous spiral feed screws 110 and 112 have a more rapid thru-put than the offset paddles 100 and 102, so that if the material is of a consistency or composition such that the paddles 100 and 102 of themselves would fail to effect the desired rate of thru-put of the material, the pressure exerted on the material by spiral feed 110 and 112 increases the rate of thru-put.

With viscous materials or free flowing granular or powdered materials the continuous spiral feed screws 110 and 112 may not be necessary and paddles 100 and 102 may be employed throughout the chambers 22 and 24, and similarly where the material is introduced as a liquid and chemical reactions occurring during advance effects a change of the material into pasty or powdered form. It is preferred to employ the spiral feed screws 110 and 112, so that the machine becomes an all purpose one capable of handling all types of materials. In all cases, the weir plates 116 and 118, above described, are individually adjustable to alter the retention time of the material in the chambers 22 and 24 in order to mix the material to the desired degree of homogeneousness. The retention time of the material in the chambers 22 and 24 and at desired points longitudinally thereof may be increased by reversing certain of the mating paddles 100 and 102.

Referring to FIGURE 6, there is more or less diagrammatically shown three adjoining pairs of paddles 100a, 102a; 100b, 102b and 100c, 102c, viewed in the direction of the arrows on line 6—6 of FIGURE 1, and progressively angularly displaced at 45 degrees, so that with the paddles turning in the direction of the arrows, there is a tendency to effect the flow of material from the infeed to the discharge end of the barrel 14. For convenience these three pairs of paddles are shown straight in FIGURE 6 rather than on a helix as in FIGURE 1, it being understood that forming them on a helix increases the flow of material from the infeed to the discharge end of the barrel 14. In FIGURE 6 the paddles 100b, 102b, are shown at the beginning of a compression cycle, in other words the pocket defined between the flanks of the paddles 100b, 102b and their enclosing chamber walls becomes smaller as the paddles 100b, 102b rotate clockwisely from their indicated positions toward the intersecting portions of the cylindrical housing parts, wth the greatest pressure on the entrapped material being exerted adjacent the contiguous portions of the flanks of the paddles 100b, 102b. It is evident then that as the paddles rotate in the direction of the arrows from their indicated positions, this area of greatest pressure is progressively closed off by paddle 100c while being progressively opened by paddle 102a, whereby the material in this area of greatest pressure is largely caused to flow backward or toward the infeed end of barrel 14 against the normal forward flow of the material. When paddle 100c clears this area of greatest pressure, flow of material therefrom can again be in a forward direction. This backward squeezing of the material into the zone of action of an adjoining pair of paddles effects a shearing and/or stretching action on the material and results in more intimate and effective mixing and kneading.

While, as stated, material is squeezed backward, the resultant direction of movement of the material will be in a forward direction, aided and abetted by the direction of displacement of the paddles, the helix angle thereof and the continuous feed sections 110 and 112 or any one of these factors.

Referring now to FIGURES 7 and 8, there is shown a modified form of the paddles. Each of the paddles 172 and 174 is formed of two paddle sections. Paddle 172 comprising paddle sections 176 and 178 in axially spaced relation, angularly offset at right angles with respect to each other and joined by a hub 180. Paddle 174 comprises similar paddle sections 182 and 184 joined by hub 186. Paddle sections 178 and 182 are angularly offset at right angles and are disposed in the same transverse vertical plane so that they interengage each other during rotation of the paddles 172 and 174 in the direction of the arrows. Paddle sections 176 and 184 are similarly disposed with respect to each other.

The cross sectional configuration of the paddle sections 176, 178, 182 and 184 are identical and the same as the cross sectional configuration of the paddles 100 and 102 described above in connection with the first form of the invention. The cross sectional configurations of the hubs 180 and 186 are defined by the overlapped portions of their respectively associated right angularly offset paddle sections 176, 178 and 182, 184.

Extending axially inwardly from the extremities of the paddle sections 176, 178, 182 and 184 are similar arms 188 in axially spaced relation with respect to the hubs 180 and 186 providing grooves therebetween. The arms 188 extend axially inward a distance such that the free end face 190 of each arm associated with paddle 172 slidably engages, except for working clearance, the wall surface 192 of a groove associated with paddle 174 upon rotation of the paddles 172 and 174, whereby these surfaces are wiped clean inhibiting accumulation of material thereon. In similar manner, the free end face 190 of each arm 188 associated with paddle 174 wipes clean the wall surface 192 of a groove associated with paddle 172.

The leading edge 194 of each arm 188 associated with paddle 172 generates the radially inner surface 196, allowance for working clearance being made, of an arm 188 associated with paddle 174, whereby these surfaces are wiped clean. In similar manner, the leading edge 194 of each arm 188 associated with paddle 174 generates the radially inner surface 196 of an arm associated with paddle 172.

Since the hubs 180 and 186, as clearly shown in FIGURE 7, follow the contour of the flanks of the paddle sections, and since the flanks and crests of the arms 188 follow the contour of the flanks and crests of the paddle sections, it is apparent from the above description in connection with paddles 100 and 102 of FIGURES 4 and 6, that the hub and the flank portions of the arms of one paddle are wiped clean by the crest edges and crests of the other paddle.

It will be apparent from the above that the paddles 172 and 174 not only wipe the walls of their enclosing cylinders 198 and 200 but also wipe all of each other's surfaces, preventing adherence of materials being mixed and eliminating dead spaces, so that more efficient and homogeneous mixing and kneading of materials is effected. With the arms 188 of the paddles on one shaft wiping through the grooves of the paddles on the other shaft, as paddles rotate in the direction of the arrows, it will be apparent that in this form of paddle construction the materials being treated are subjected to intense shearing action providing for more intimate and homogeneous mixing and kneading thereof.

FIGURE 9 discloses a modified form of paddles 202 and 204 generally similar to the paddles 172 and 174 described above in connection with FIGURES 7 and 8. In this modified form the paddle sections 206 and 208 of paddle 202 corresponding to paddle sections 176 and 178 of paddle 172, and paddle sections 210 and 212 of paddle 204 corresponding to paddle sections 182 and 184 of paddle 174, have at the extremities of their major axes, trips instead of arcuate crests, so that the flanks are point generated rather than arc generated as are the flanks of the paddle sections of FIGURES 7 and 8.

In FIGURES 10 and 11 there is shown a modification of the invention in which the cylindrical intersecting chambers 214 and 216 of the barrel 218 are provided with the longitudinally offset baffle plates 220 and 222. While only one baffle is shown in each chamber, it is understood that a series of such baffles may be provided. In order to accommodate the baffle 220, the paddle in chamber 214 which interengages with paddle 224 in chamber 216 is formed of axially spaced paddle sections 226. Similarly, to accommodate the baffle 222, the paddle in chamber 216 which interengages with paddle 228 in chamber 214 is formed of axially spaced paddle sections 230. While the paddles and paddle sections are shown as having a cross sectional profile wherein the flanks meet along a common edge, it is apparent that their cross sectional profiles may be the same as described above in connection with FIGURES 4 and 5. Adjacent the communicating portions of the chambers 214 and 216, the baffles 220 and 222 are formed with the concave arcuate edges 232 and 234 closely following the path of the major exis extremities of the paddles 224 and 228, whereby they wipe each other to prevent accumulation thereon of material being mixed and kneaded.

It will be apparent that the baffles 220 and 222 impart to the material a serpentine path of travel, increasing its flow length without a corresponding lengthening of the barrel 218, whereby the retention time of the material is increased permitting it to be subjected to more shear periods per revolution of the paddles, and thereby to effect a more intense mixing and kneading of the material.

We claim.

1. A mixer comprising housing means in the form of parallel intersecting cylinders, axially arranged pairs of radially interengaging rotatable members mounted on shafts, extending axially of said cylinders, for rotation therein, each member in cross section each having convex flanks joined at both outer ends by arcuate crests formed on radii at least substantially equal to the radius of their associated cylinder, drive means for rotating said members in the same direction, and the flanks of each of said members being substantially generated by portions of the crests of the other member, whereby the creasts of each of said members wipes the walls of its associated cylinder and the flanks of each of said members is wiped by portions of the crests of the other member.

2. A mixer comprising: housing means in the form of parallel intersecting cylinders, a shaft extending axially through each of said cylinders, a plurality of pairs of radially interengaging symmetrical paddles mounted on said shafts for rotation therewith, means for rotating said shafts in the same direction and at the same speed, each of said paddles being lenticular in cross section and having blanks with ends comprising arcuate crests formed on radii described from the axis of, and substantially equal to the radii of their respective cylinders, the crests having crest edges at the junctures of the flanks and crests, each pair of interengaging paddles being disposed with their major axes at right angles with respect to each other, and the flanks of each one of a pair of interengaging paddles being substantially generated by the crest edges and crests of the other of said pair of interengaging paddles.

3. A device according to claim 2 wherein adjacent paddles on each of said shafts are progressively offset at angles of 45 degrees.

4. A continuous mixer comprising a housing in the form of parallel intersecting cylinders, a shaft extending axially through each of said cylinders, a plurality of radially extending, interengaging paddles mounted on said shafts for rotation therewith, means for rotating said shafts in the same direction, each of said paddles having a pair of axially spaced paddle sections, the flank profiles of each of said paddle sections of one interengaging radially adjacent paddle being generated by the major axis extremities of the paddle section of a paddle with which it is interengaged, a hub joining the paddle sections of each of said paddles conforming to the flank profiles of said paddle sections, and each of said paddle sections at their major axis extremities having axially inwardly extending projections radially spaced from said hub to provide therebetween a groove for passage therethrough of the projection of a paddle section of an interengaging paddle.

5. A device in accordance with claim 4 wherein the major axis extremities of each of said paddle sections are provided with arcuate crests formed on radii described from the axis of, and substantially equal to the radii of their respective cylinders.

6. A device in accordance with claim 4 wherein said projections are formed with their radially inner surfaces arranged so that the radially inner surfaces of the projections of the paddles on one shaft pass the radially inner surfaces of the projections of the paddles on the other shaft with a negligible clearance therebetween.

7. A device of the class described comprising a housing in the form of parallel intersecting cylinders, a shaft extending axially through each of said cylinders, a plurality of radially extending, interengaging paddles mounted on said shafts for rotation therewith, means for rotating said shafts in the same direction, each of said paddles having a pair of axially spaced paddle sections, lenticular shaped in cross section with their major axes at right angles with respect to each other, the flank profiles of each of said paddle sections of one interengaging radially adjacent paddle being generated by the major axis extremities of the paddle section of a paddle with which it is interengaged, a hub joining the paddle sections of each of said paddles conforming to the flank profiles of said paddle sections, each of said paddle sections at their major axis extremities having axially inwardly extending projections radially spaced from said hub to provide therebetween a groove for passage therethrough of the projection of a paddle section of an interengaging paddle, and the radially inner surface of each projection of one of a pair of interengaging paddles being generated by the leading inner edge of the projection of the other of a pair of interengaging paddles.

8. A device of the class described comprising a housing in the form of parallel intersecting cylinders, a shaft extending axially through each of said cylinders, a plurality of axially arranged pairs of radially interengaging paddles housing flanks and crests mounted on said shafts for rotation therewith, means for rotating said shafts in the same direction, the flank profiles of each of one of a pair of interengaging paddles being traced by the crest edges of the other of said pair of interengaging paddles, and axially spaced baffle plates fixed in said cylinders between said paddles, to effect a serpentine path of travel of material through said housing.

9. In a mixer; housing means in the form of parallel intersecting cylinders; and axially parallel shaft means extending generally axially through said cylinders including a plurality of pairs of generally radially opposed and substantially engaging paddle means mounted for rotation with said shaft means; said paddle means including a pair of generally radially opposed paddle portions having intermeshing, axially extending projection means and opening means within which said projection means are received as said paddle means rotate.

10. In a mixer; housing means in the form of parallel intersecting cylinders; a pair of axially parallel shaft means extending generally axially through said cylinders including a plurality of pairs of generally radially opposed and substantially engaging paddle means mounted for rotation with said shaft means; said paddle means including a pair of axially spaced paddle sections on one of said shaft means having axially extending projection means and opening means within which said projection means are received, and flank profile portions of said paddle sections being generated by a portion of the radially adjacent paddle means.

11. In a mixer; housing means in the form of parallel intersecting cylinders; axially parallel shaft means extending generally axially through said cylinders including a plurality of pairs of generally radially opposed and substantially engaging paddle means mounted for rotation with said shaft means; each paddle means of one of said pairs including a pair of axially spaced paddle sections having axially extending projection means and the other paddle means of said one of said pairs having opening means within which said projection means are received as said paddle means rotate; and flank profile portions of said paddle sections being generated by portions of the radially adjacent paddle sections.

References Cited by the Examiner

UNITED STATES PATENTS

| | | | |
|---|---|---|---|
| 941,767 | 11/09 | Dickson | 259—6 |
| 1,356,296 | 10/20 | Casse | 259—6 |
| 1,487,208 | 3/24 | Cooke et al. | 259—7 |
| 1,530,020 | 3/25 | Tiedke | 259—104 |
| 1,897,361 | 2/33 | Calkins | 259—6 |
| 2,584,225 | 2/52 | Plunguian et al. | 259—6 |
| 2,670,188 | 2/54 | Erdmenger | 259—104 |
| 2,693,348 | 11/54 | Ellermann | 259—41 |
| 2,756,971 | 7/56 | Stults | 259—9 |
| 2,814,472 | 11/57 | Erdmenger | 259—104 |
| 2,883,162 | 4/59 | Rapson | 259—104 X |
| 3,122,356 | 2/64 | Erdmenger | 259—104 |

FOREIGN PATENTS

| | | |
|---|---|---|
| 19,754 | 10/95 | Great Britain. |
| 713,353 | 8/54 | Great Britain. |
| 530,321 | 7/55 | Italy. |

CHARLES A. WILLMUTH, *Primary Examiner.*

WALTER A. SCHEEL, *Examiner.*

REEXAMINATION CERTIFICATE (193rd)
United States Patent [19]
Loomans et al.

[11] B1 3,195,868

[45] Certificate Issued May 22, 1984

[54] CONTINUOUS MIXER

[75] Inventors: Bernard A. Loomans, York; Ambrose K. Brennan, Jr., Thomasville, both of Pa.

[73] Assignee: Baker Perkins Inc., New York, N.Y.

Reexamination Request:
No. 90/000,380, May 11, 1983

Reexamination Certificate for:
Patent No.: 3,195,868
Issued: Jul. 20, 1965
Appl. No.: 181,278
Filed: Mar. 21, 1962

Certificate of Correction issued May 21, 1968.

[51] Int. Cl.$^3$ .................................. B01F 7/04
[52] U.S. Cl. ........................ 366/85; 366/291; 366/301
[58] Field of Search ............ 366/85, 291, 301, 297, 366/319, 157, 154; 418/201; 425/207, 208

[56] References Cited

U.S. PATENT DOCUMENTS

| | | | |
|---|---|---|---|
| 941,767 | 11/1909 | Dickson | 366/192 |
| 1,227,522 | 5/1917 | Banbury | 366/177 |
| 1,356,296 | 10/1920 | Casse | 366/76 |
| 1,487,208 | 3/1924 | Cooke | 366/157 |
| 1,530,020 | 3/1925 | Tiedke | 366/77 |
| 1,846,692 | 2/1932 | Schmidt | 418/206 |
| 1,846,700 | 2/1932 | Ungar | 418/201 |
| 1,868,671 | 7/1932 | Nelson | 366/3 |
| 1,897,361 | 2/1933 | Calkins | 366/154 |
| 2,434,707 | 1/1948 | Marshall | 366/182 |
| 2,495,241 | 1/1950 | Eaby | 366/177 |
| 2,581,451 | 1/1952 | Sennet | 366/85 |
| 2,584,225 | 2/1952 | Plunguian | 366/157 |
| 2,631,016 | 3/1953 | Laubarede | 366/145 |
| 2,670,188 | 2/1954 | Erdmenger | 366/97 |
| 2,672,404 | 3/1954 | Schultz | 366/192 |
| 2,693,348 | 11/1954 | Ellermann | 366/85 |
| 2,698,962 | 1/1955 | Swallow | 425/204 |
| 2,756,971 | 7/1956 | Stults | 366/319 |
| 2,782,963 | 2/1957 | Erdmenger | 222/236 |
| 2,814,472 | 11/1957 | Erdmenger | 366/97 |
| 2,883,162 | 4/1959 | Rapson | 366/149 |
| 3,122,356 | 2/1964 | Erdmenger | 366/85 |
| 3,155,056 | 11/1964 | Smith | 366/77 |

FOREIGN PATENT DOCUMENTS

| | | | |
|---|---|---|---|
| 565332 | 7/1960 | Belgium . | |
| 131392 | 9/1901 | Fed. Rep. of Germany . | |
| 295431 | 7/1914 | Fed. Rep. of Germany . | |
| 813154 | 9/1951 | Fed. Rep. of Germany . | |
| 862668 | 1/1953 | Fed. Rep. of Germany . | |
| 938224 | 1/1956 | Fed. Rep. of Germany . | |
| 530321 | 7/1955 | Italy | 366/76 |
| 19754 | 10/1895 | United Kingdom | 366/76 |
| 713353 | 8/1954 | United Kingdom | 366/85 |

OTHER PUBLICATIONS

"Kontinuierlich Arbeitende Knetmaschinen zur Herstellung von Schokoladen-Massen" by Von Dipl.-Kfm. P. Maier, published in 1959 by *Fette-Seifen-Anstrichmittel-Die Ernahrugsindustrie* 61, pp. 686–690; Industrieverlag von Hernhaussen KG, Hamburg, Germany.

K. Riess and R. Erdmenger: Kontinuierlicher Press- und Knetverfahren ("Continuous Compression and Kneading Processes") VDI-Zeitschrift Bd. 93, Nr. 19/20 Jul. 11, 1951.

"Schneckenmaschinen, Ihre Theorie und Anwendung in der Chemischen Technik Insbesondere in der Kunststoffverarbeitung", Mitteilungen der Verfahrenstechnischen Versuchsgruppe der Badischen Anilin- & Soda-Fabrik Aktiengesellschaft, Ludwigschafen am Rhein (BASF) published in 1960; pp. 114 to 127.

*Primary Examiner*—Robert W. Jenkins

EXEMPLARY CLAIM

1. A mixer comprising; housing means in the form of parallel intersecting cylinders, axially arranged pairs of radially interengaging rotatable members mounted on shafts, extending axially of said cylinders, for rotation therein, each member in cross section having convex flanks joined at both outer ends by arcuate crests formed on radii at least substantially equal to the radius of their associated cylinder, drive means for rotating said members in the same direction, and the flanks of each of said members being substantially generated by portions of the crests of the other member, whereby the crests of each of said members wipes the walls of its associated cylinder and the flanks of each of said members are wiped by portions of the crests of the other member.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-11 is confirmed.

\* \* \* \* \*